L. T. HAGAN.
MOTOR PLOW AND TRACTION ENGINE.
APPLICATION FILED AUG. 10, 1911.
1,077,878.
Patented Nov. 4, 1913.
5 SHEETS—SHEET 2.
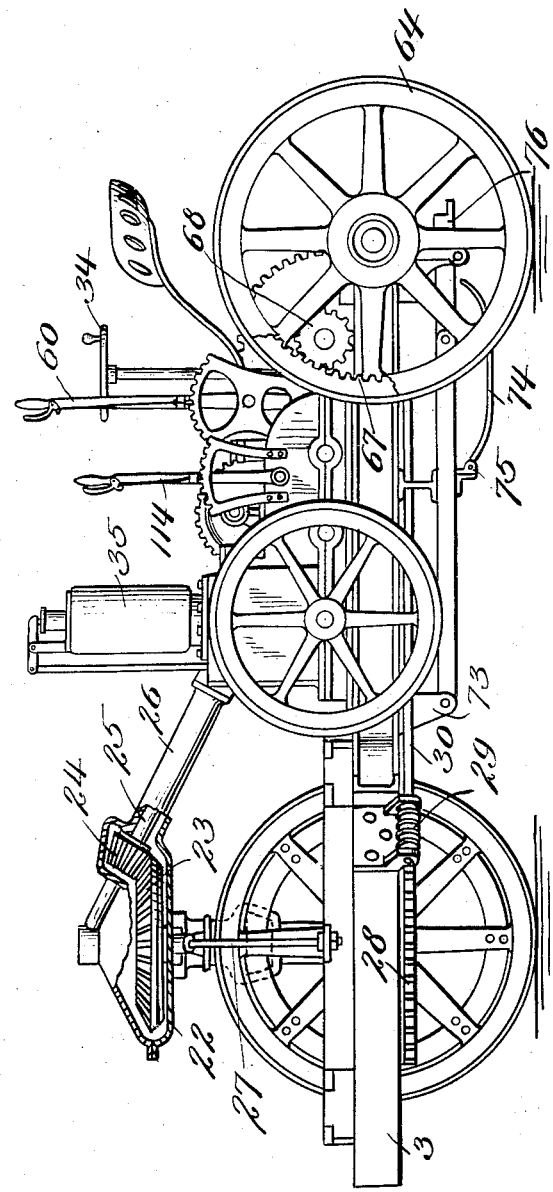

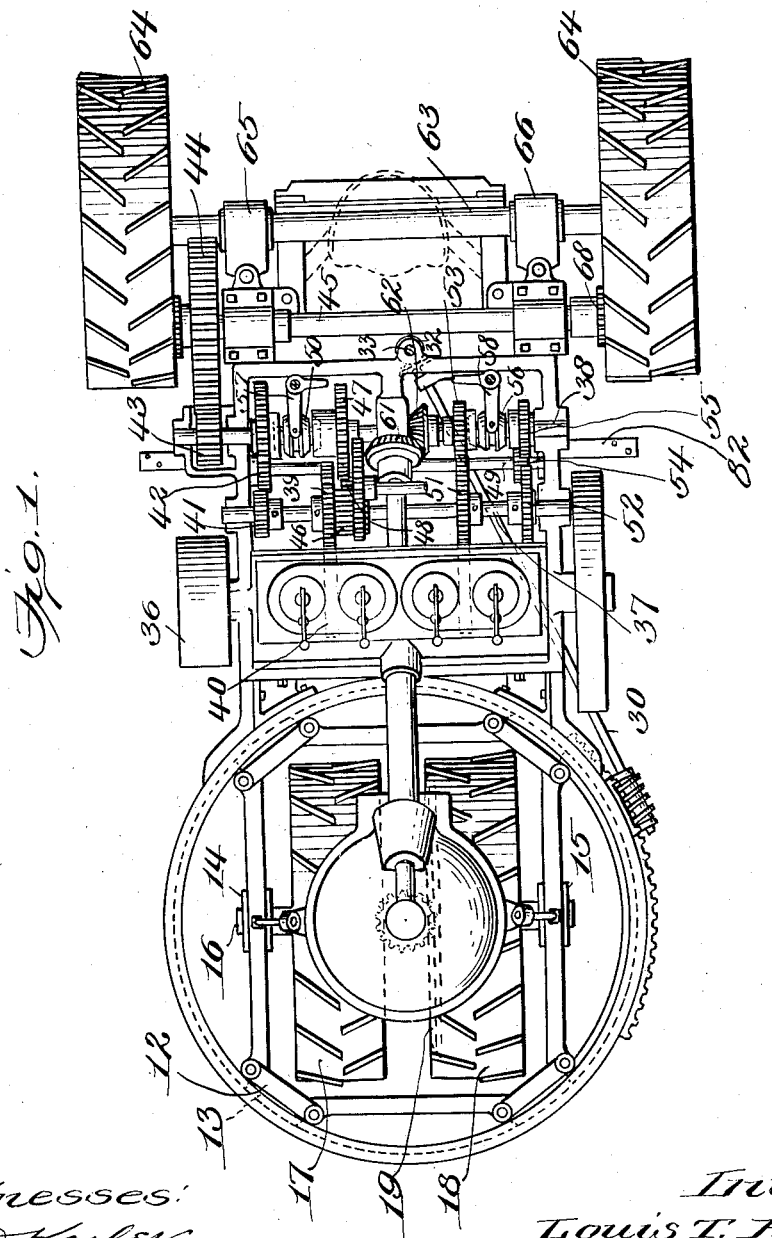

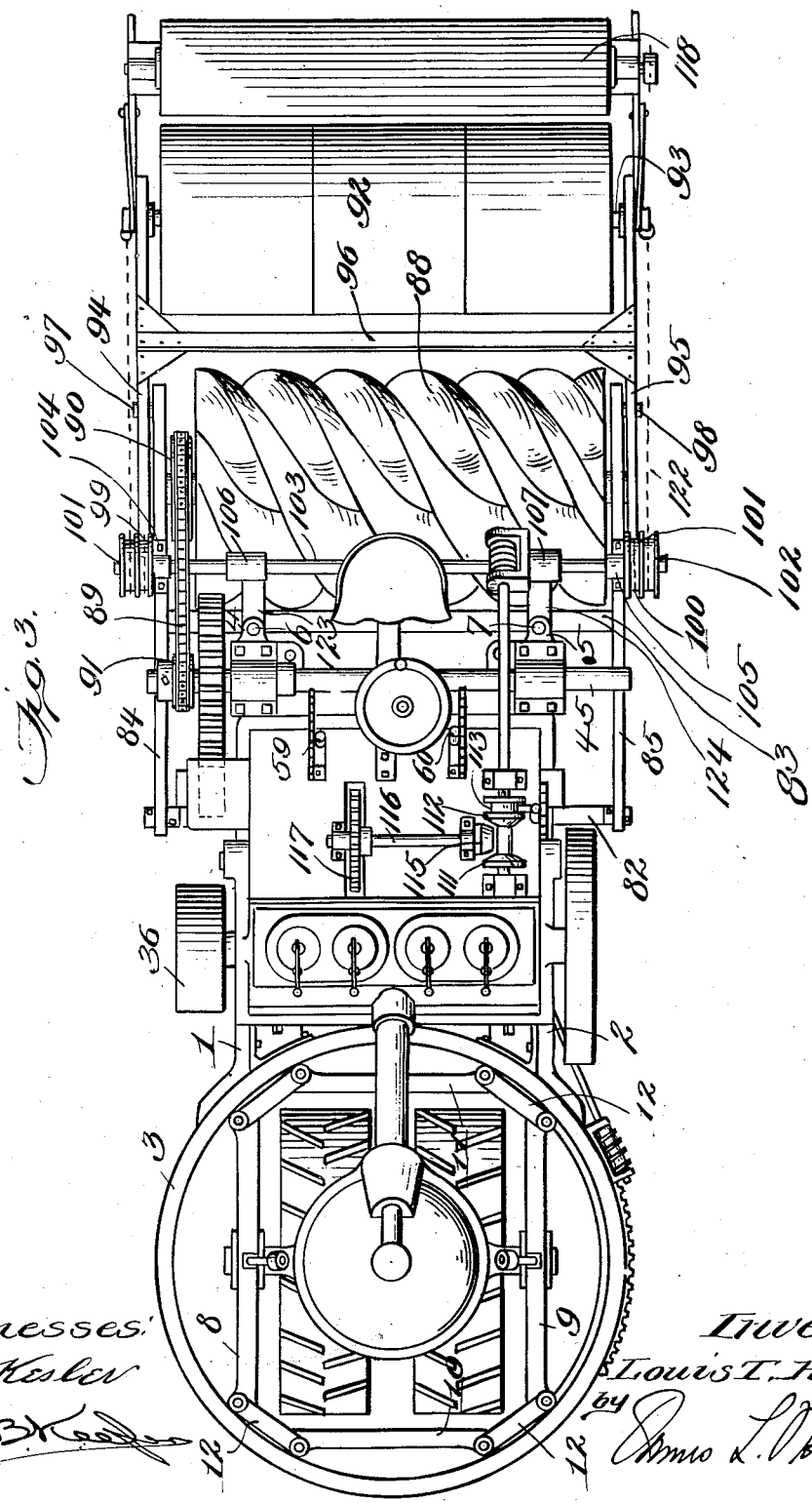

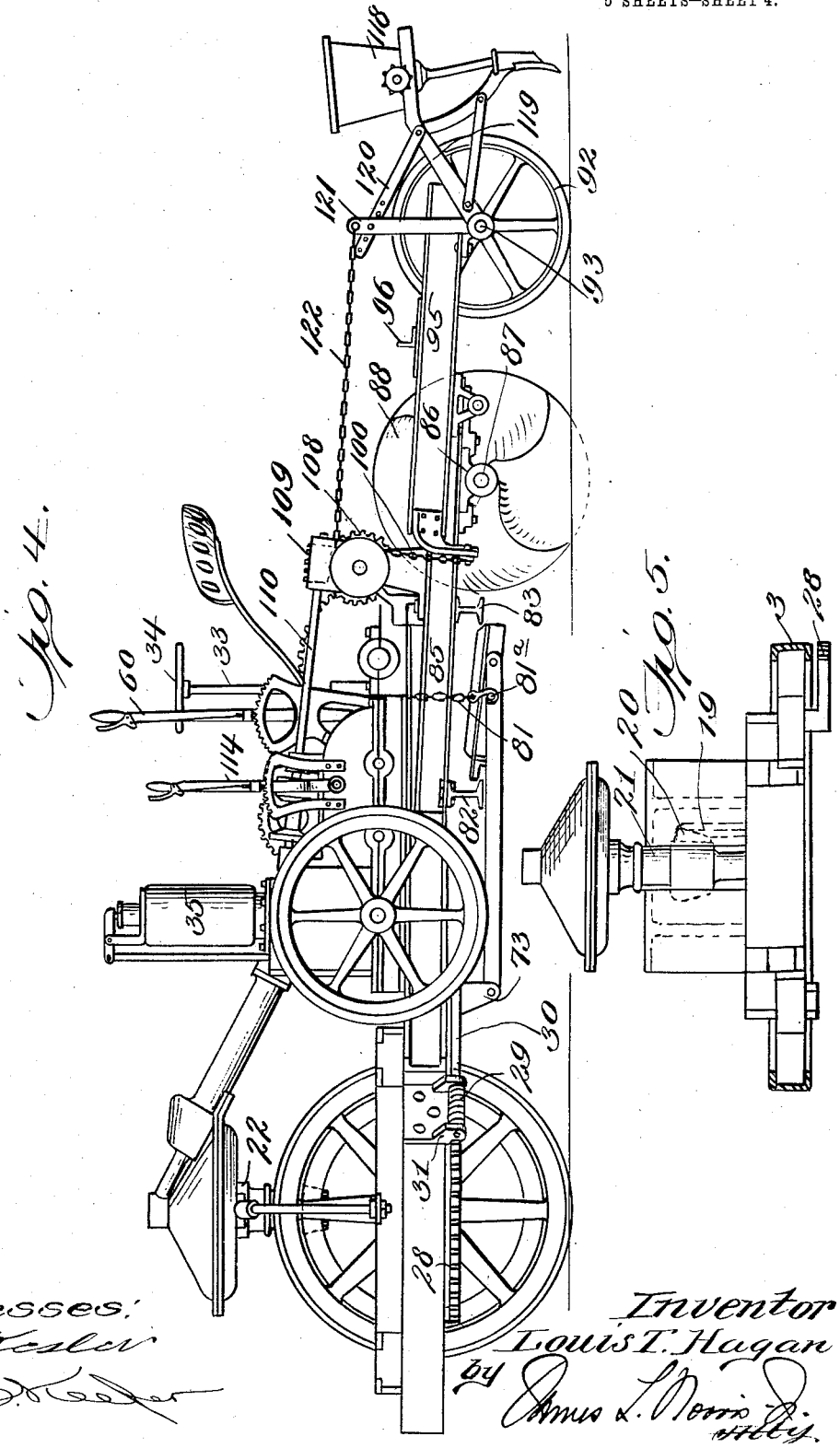

L. T. HAGAN.
MOTOR PLOW AND TRACTION ENGINE.
APPLICATION FILED AUG. 10, 1911.
1,077,878.
Patented Nov. 4, 1913.
5 SHEETS—SHEET 5.
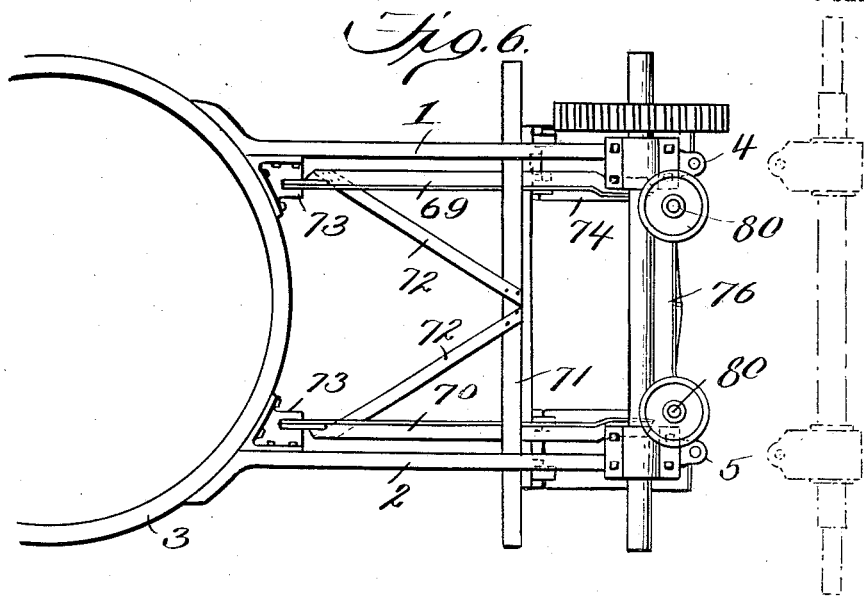
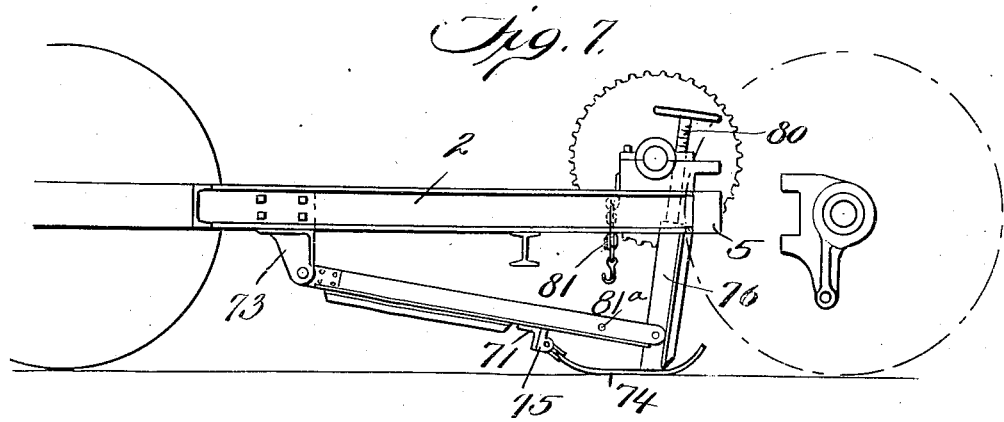
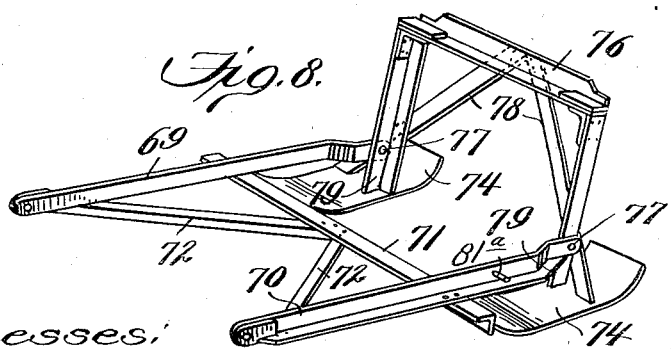
Witnesses:
Inventor
Louis T. Hagan
by
Atty

UNITED STATES PATENT OFFICE.

LOUIS T. HAGAN, OF WINCHESTER, KENTUCKY, ASSIGNOR TO HAGAN GAS ENGINE MFG. CO., OF WINCHESTER, KENTUCKY, A CORPORATION OF KENTUCKY.

MOTOR-PLOW AND TRACTION-ENGINE.

1,077,878.  Specification of Letters Patent.  Patented Nov. 4, 1913.

Application filed August 10, 1911. Serial No. 643,387.

*To all whom it may concern:*

Be it known that I, LOUIS T. HAGAN, a citizen of the United States, residing at Winchester, in the county of Clark and State of Kentucky, have invented new and useful Improvements in Motor - Plows and Traction-Engines, of which the following is a specification.

My present invention relates to improvements in motor - propelled apparatus and more particularly to that of the character adapted for use as a motor plow or agricultural machine and a traction engine, and the primary object of the invention is to provide an improved apparatus which is capable of being readily and conveniently converted into either a motor plow or a traction engine, the main part of the apparatus being common to the two types of machines, it being necessary only to couple the appropriate attachment to the rear of the machine.

Another object of the invention is to provide a plow attachment and also a seeder when desired, means being provided for conveniently adjusting the plow and also the seeder, when used, whereby the depth of such implements with respect to the ground may be adjusted, and, furthermore, such implements may be wholly removed from or elevated above the ground during moving of the machine from one place to another.

Another object of the invention is to provide a combined jack and draw bar which serves to facilitate the coupling and uncoupling of either the plow or traction engine attachments to the main frame and also constitutes a draw bar when the traction engine attachment is in use.

A further object of the invention is to provide a motor-driven machine for plowing or preparing the soil for agricultural purposes which shall be light in weight, strong, compact and capable of being conveniently turned in a small space and adapted to be driven forward or backward at different desired speeds.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a top plan view of a motor-driven machine constructed in accordance with one embodiment of my invention, the traction engine attachment being shown coupled thereto; Fig. 2 is a side elevation of the machine as shown in Fig. 1; Fig. 3 is a top plan view of the machine showing the plow attachment coupled thereto; Fig. 4 is a side elevation of the apparatus as shown in Fig. 3; Fig. 5 is a detail view of the turntable for the traction and steering wheels at the front of the machine; Figs. 6 and 7 indicate diagrammatically in plan and side elevation respectively the manner of using the jack to facilitate the coupling and uncoupling of the traction or plow attachments; and Fig. 8 is a detail perspective view of the combined jack and draw bar.

Similar parts are designated by the same reference characters in the several views.

In the present embodiment of my invention, the machine comprises a main frame composed principally of the side members 1 and 2 which are rigidly connected at their forward ends to an annular frame 3, the latter constituting a part of the turntable for the forward traction and steering wheels, the rear ends of the side members of the main frame being provided with coupling brackets 4 and 5 which brackets in the present instance have vertical apertures to receive removable coupling pins 6 and 7. The annular frame 3 at the forward end of the machine is preferably of channel shape in cross-section, as shown in Fig. 5, and it contains a frame composed of the side members 8 and 9, the end members 10 and 11, and the corner - connecting members 12 which unite the side and end members rigidly.

The inner frame may coöperate with the outer annular frame in any suitable way, the corner-connecting members 12 in the present instance having projections 13 which operate in the channel of the circular frame and thereby support the latter although permitting the inner frame to rotate within the outer annular frame. The inner frame is provided with suitable bearings 14 and 15 and an axle 16 is journaled in these bearings. A pair of traction wheels 17 and 18 are keyed or otherwise rigidly secured to the axle 16 so that these wheels may serve for traction purposes to turn in unison. One of these traction wheels (the wheel 18 in the present instance) is provided at its inner side with a bevel gear 19 which coöperates with a bevel pinion 20 fixed to a vertical shaft 21, the shaft 21 being suitably mounted in a rigid casing 22 and carries a bevel gear 23 at its upper end, this bevel gear 23 coöperating with a bevel pinion 24 fixed to a rearwardly extending inclined shaft 25 contained in a suitable casing 26. The casing 22 may be reinforced by stay bolts 27 which in the present instance are shown connected to the side members of the inner frame. The shaft 25 serves to propel the traction wheels and the construction just described enables power to be transmitted to the traction wheels irrespective of the angular relation of these wheels to the main frame. In the present construction, these forward traction wheels serve for steering purposes and to this end the inner frame which serves as a mounting for the traction wheels is also provided with a worm sector 28 which coöperates with a worm 29, the latter being fixed to a shaft 30 journaled at one end in a bracket 31 secured to the annular frame 3 at a point adjacent to the worm, and the rear end of the shaft 30 is connected by bevel gears 32 to a vertical steering shaft 33 which is mounted on the main frame of the machine and is provided with a steering wheel 34 within convenient reach of the operator.

A motor 35 is mounted on the main frame, the usual internal combustion engine being generally preferable, and this motor serves to propel and operate the apparatus and it may also serve for general power purposes, it having a belt wheel 36 whereby power may be transmitted to apparatus of various kinds. A pair of transmission shafts 37 and 38 are suitably journaled in the main frame of the machine, the shaft 37 being provided with a gear 39 which is fixed thereto and coöperates with a driving gear 40 on the engine shaft, and the shaft 37 also has a pinion 41 rigidly connected thereto, this pinion just mentioned coöperating with a relatively larger gear 42 which may be mounted loosely on the shaft 38. The shaft 38 is provided with a pinion 43 which coöperates with a relatively larger gear 44 fixed to a propeller shaft 45. The shaft 38 with its connected parts is driven in a forward direction through the pinion 41 and its coöperating gear 42. Reverse motion at a relatively lower speed may be obtained by a pinion 46 rigidly mounted on the shaft 37, a relatively larger gear 47 on the shaft 38, and an interposed idler gear 48 which coöperates with the pinion 46 and the gear 47 and is mounted on an intermediate shaft 49, the proportioning of these gears being preferably such that the reverse motion will be at a relatively low speed as compared with the forward motion. In the form of transmission shown, the gears 42 and 47 are both mounted loosely with respect to the shaft 38 and either of these gears may be connected to the shaft 38 by means of a shiftable clutch collar 50 which may be splined on the shaft 38. By shifting the clutch collar 50, the machine may be driven either in a forward or a backward direction.

To enable the machine to be driven either forward or backward at relatively higher speeds than provided for by the gearing just described, a similar system of transmission gearing may be used wherein the proportioning of the gears is somewhat different. In the present instance, I have shown the shaft 38 as provided with an additional pair of gears 51 and 52 which are relatively larger than the pinions 41 and 46, these gears coöperating respectively with the pinion 53 and the idler 54, the latter in turn coöperating with the pinion 55 on the shaft 38. The pinions 53 and 55 are both mounted loosely on the shaft 38 and either one of these pinions may be operatively connected to the shaft 38 by a clutch collar 56 which is splined on the shaft 38. By connecting the pinion 53 to the shaft 38, forward motion at a relatively higher speed than afforded by the gear 42 may be obtained and by operatively connecting the pinion 55 with the shaft 38, backward motion of the machine at a relatively higher speed than afforded by the gear 47 may be obtained. The two clutch collars are operated respectively by the clutch forks 57 and 58, these forks being operatively connected to suitable levers 59 and 60 respectively. The forward traction and steering wheels are driven through the medium of the propeller shaft 25, the latter being provided for this purpose with a bevel pinion 61 at its rear end which coöperates with a similar pinion 62 fixed to the transmission shaft 38.

In Figs. 1 and 2 the machine is adapted for use primarily as a traction engine, it having the rear traction wheel attachment coupled to the rear thereof. In the present instance, the traction wheel attachment comprises a shaft 63 having traction wheels 64 connected thereto and the shaft has bearing members 65 and 66 which are detachably coupled to the rear of the main frame of the machine by the brackets 4 and 5 and the coupling pins 6 and 7. Power may be transmitted to the rear traction wheels from the driving shaft 45 in any suitable way, the traction wheels in the present instance being also provided with internal gears 67 which coöperate with pinions 68 which are fixed upon the ends of the shaft 45.

The present invention provides a combined jack and draft appliance which facilitates the coupling and uncoupling of the plow or traction wheel attachments and also serves as a draw bar when the machine is used as a traction engine. This device consists of a frame composed of a pair of side members 69 and 70 connected by a rigid cross member 71 and braced by the diagonal members 72. One end of the frame is pivoted on the brackets 73 hung from the under side of the main frame and the opposite or free end of the frame has a pair of foot members 74 connected thereto, these members in the present instance being hinged to the brackets 75 which latter are secured to the cross member 71 of the swinging frame. A yoke 76 is also pivoted at the points 77 to the rear ends of the side members 69 and 70 of the swinging frame, the yoke being of rigid construction and braced by the diagonal members 78 to prevent distortion of the yoke when the latter sustains the weight of the rear end of the machine, and the lower ends 79 of the yoke are adapted to bear directly upon the foot members 74 when the yoke is in use as a jack. The rear portion of the main frame of the machine is provided with a pair of jack screws 80. When it is desired to couple or uncouple one of the attachments, the swinging frame beneath the main frame of the machine is lowered and the yoke 76 is adjusted to the position shown in Fig. 7. By operating the jack screws 80, the latter will bear upon the upper end of the yoke 76 and will thereby support the rear portion of the main part of the machine in such position as to facilitate uncoupling of one attachment and the coupling of another attachment. Owing to the flat form of the foot members 74, the latter may serve as supports or skids whereby the main part of the machine may be moved from one place to another when neither of the attachments is coupled thereto. While the traction wheel attachment is coupled to the main part of the machine, the hinged frame is lifted and supported in folded condition beneath the main frame of the machine by chains 81 adapted to engage pins 81ª on the hinged frame, the yoke 76 extending rearwardly in alinement with the frame embodying the side members 69 and 70 and this yoke, together with the side frames, serves as a draft appliance or draw bar whereby vehicles or other objects may be connected behind the traction engine to be drawn along thereby.

While the plow attachment is coupled to the machine, the yoke is folded forwardly as shown in Fig. 4, thereby avoiding interference with the plow.

The main frame of the machine is also provided with a transverse beam 82 which is utilized to support a pair of auxiliary side members 84 and 85, the latter being rigidly connected by a cross beam 83 and serving as parts of the plow attachment, the auxiliary side members being bolted or otherwise detachably connected to the transverse beam 82 to enable them to be readily removed with the plow attachment. The rear ends of these auxiliary side members are provided with bearings 86, a shaft 87 is journaled in these bearings, and a spiral plow 88 is fixed to the shaft. Suitable means is provided for rotating the spiral plow in the same direction as, but at a higher speed than, the traction wheels whereby the soil will be loosened and thrown obliquely to the rear of the line of motion of the machine. In the present instance a sprocket chain 89 is employed which coöperates with sprocket wheels 90 and 91 fixed respectively to the plow shaft and to the driving shaft 45 on the main frame of the machine. The sprocket wheel 91 is removably connected to the driving shaft 45 whereby the pinions 68 may be attached thereto when the traction wheel attachment is applied in place of the plow attachment.

The rear end of the machine when used as a plow is supported by a roller 92 which also performs the function of breaking up lumps of earth loosened by the plow. This roller in the present instance is mounted on a transverse shaft 93 and this shaft is mounted on the rear portion of an adjusting frame which is composed of the side members 94 and 95 and a transverse connecting member 96, the adjusting frame being pivotally connected to the auxiliary side members 84 and 85 by the pivots 97 and 98, and the forward ends of the side members 94 and 95 of the adjusting frame have adjusting chains 99 and 100 connected thereto, these chains coöperating with grooved drums 101 and 102, these drums being fixed upon a transverse adjusting shaft 103 journaled in bearings 104 and 105 carried by the auxiliary side members 84 and 85 of the plow attachment and also coöperating with bearings 106 and 107 which form parts of brackets 123 and 124, a transverse beam 83 forming a part of the plow attachment and serving to rigidly connect the auxiliary side members 84 and 85 thereof. The adjusting shaft 103 is provided with a worm wheel 108 which coöperates with a worm 109, the latter being fixed to a forwardly extending shaft 110 and this shaft has a pair of friction wheels or equivalents 111 and 112 splined thereon and provided with a collar 113 and adjusting lever 114 whereby either of the friction wheels may be set in coöperative relation with an interposed friction wheel 115 so as to rotate the shaft 103 and consequently the drums 101 and 102 to either elevate or lower the plow, the friction wheel 115 being mounted on a shaft 116 which is provided with a gear 117 and the gear 117 receives continuous motion in one direction from the pinion 46 on the transmission shaft 37. By the mechanism just described, the depth of the plow with respect to the ground may be varied or adjusted, and, moreover, the plow may be wholly elevated above the ground to enable the machine to be moved from one place to another, power to effect this adjustment being obtained from the driving mechanism of the machine, and the worm and worm wheel connection with the shaft 103 serves to retain the plow frame in different adjusted positions.

In some cases it may also be desirable to mount a seeder in rear of the plow. In the present instance I have shown a seeder 118 which is mounted on a frame 119, the frame being pivoted to swing about the shaft 93 of the roller 92 and is adjustably connected by the links 120 to lifting arms 121 at opposite sides of the machine, these lifting arms being connected to chains 122 and such chains coöperate with the drums 101 and 102. When the adjusting shaft 103 is rotated, the seeder will be lifted or lowered according to the corresponding adjustments or movements of the plow. The plow attachment is removably coupled to the main frame of the machine by the brackets 123 and 124 which in the present instance form parts of the bearings 106 and 107 and are adapted to coöperate with the coupling brackets 3 and 4 at the rear ends of the main frame, the coupling pins 6 and 7 serving to removably connect the brackets.

I claim as my invention:—

1. In an apparatus of the class described, the combination of a main section embodying traction wheels and propelling means therefor, and an auxiliary section detachably coupled to the main section to form a longitudinal extension thereof and embodying means for supporting a portion of the latter.

2. In an apparatus of the class described, the combination of a main section embodying traction wheels and propelling means therefor, an auxiliary section embodying means for supporting one end of the main section forming a longitudinal extension of the main section and having a frame, and means for detachably coupling the main section to the frame of the auxiliary section.

3. In an apparatus of the class described, the combination of a main section embodying traction wheels supporting the forward end thereof and propelling means therefor, an auxiliary section forming a longitudinal extension of the main section and embodying a frame and means for supporting the rear end of the main section, and means for detachably coupling the main section to the frame of the auxiliary section.

4. In an apparatus of the class described, the combination of a main section embodying traction and steering wheels arranged toward the forward end thereof and propelling means for said wheels, an auxiliary section forming a longitudinal extension of the main section and embodying means for supporting the rear end of the main section, frames for the main and auxiliary sections, and means for detachably coupling said frames of the main and auxiliary sections.

5. In an apparatus of the class described, the combination of a main section embodying traction wheels and propelling means therefor, an auxiliary section detachably coupled to the main section and supporting one end thereof, a jack carried by the main section and embodying means for supporting the latter during coupling or uncoupling of the auxiliary section, and means coöperative with the jack to movably support the main section when the auxiliary section is uncoupled therefrom.

6. In an apparatus of the character described, the combination of a main section having traction wheels supporting its forward end and also having propelling means therefor, an attachment removably coupled to and supporting the rear portion of the main section, and a jack and skids combined with the main section and operative to support the rear portion thereof while said attachment is uncoupled therefrom.

7. The combination of a main section having traction wheels supporting its forward end and propelling means therefor, an attachment having means for detachably coupling it to the rear portion of the main section to support the latter and form a longitudinal extension thereof, and a jack carried by the rear portion of the main section and embodying means for adjusting it to set the rear portion of the main section and the attachment in coupling relation.

8. The combination of a main section embodying means for supporting the forward portion thereof, a supporting attachment having means for coupling it to the rear portion of the main section, ground-engaging means capable of vertical movement with respect to the main section and provided with draft means, a member connected to said draft means and adapted to bear upon said ground-engaging means, and means for adjusting the vertical relation between said member and the main section whereby the rear portion of the latter is supported during coupling or uncoupling of said attachment.

9. In an apparatus of the class described, the combination of a main section embodying means for supporting the forward end thereof, a supporting attachment removably coupled to the rear portion of the main section, a draft frame adjustably connected to the main section and carrying vertically movable ground-engaging means, and a collapsible member interposed between the ground-engaging means and the main section for adjusting the elevation of the latter.

10. In an apparatus of the class described, the combination of a main section embodying means for supporting the forward end thereof, a supporting attachment removably coupled to the rear portion of the main section, a vertically movable draft frame pivotally connected to the main section and carrying a pair of ground-engaging skids, and foldable means for imposing the weight of the rear portion of the main section upon the ground-engaging skids.

11. In an apparatus of the class described, the combination of a main section embodying means for supporting the forward end thereof, a supporting attachment removably coupled to the rear portion of the main section, a vertically movable draft frame pivotally connected to the main section and having a pair of ground-engaging skids pivotally connected thereto, and a foldable member interposed between said ground-engaging skids and the main section and connected to said draft frame for imposing the weight of the rear portion of the main section upon said skids.

12. In an apparatus of the class described, the combination of a main section embodying means for supporting the forward end thereof, a supporting attachment removably coupled to the rear portion of the main section, ground-engaging means connected to the main section and capable of vertical movement with respect thereto, draft means for the ground-engaging means, a member connected to the draft means and bearing upon the ground-engaging means, and screws coöperative with the rear portion of the main frame and with said member for adjusting the elevation of the rear portion of the main section and imposing the weight thereof upon the ground-engaging means.

13. In an apparatus of the class described, the combination of a main section, means for supporting the forward end thereof, a supporting attachment removably coupled to the rear portion thereof, and a combined jack and draft appliance embodying a frame pivotally connected to the main section and capable of vertical movement with respect thereto, said frame being provided with ground-engaging means, and a member pivotally connected to said frame and capable of being interposed between the main section and the ground-engaging means to support the rear portion of the main section, said member being also capable of occupying a position in substantial alinement with said frame to serve as a draft appliance.

14. In an apparatus of the class described, the combination of a main section embodying traction wheels for supporting the forward end thereof and propelling means for the traction wheels, and a plow attachment detachably coupled to the main section and embodying ground wheels for supporting the rear portion thereof.

15. In an apparatus of the class described, the combination of a main section embodying traction wheels supporting the forward end thereof and propelling means for said wheels, a plow attachment detachably coupled to the rear portion of the main section and carrying ground wheels supporting the same, and means for adjusting the plow attachment vertically to vary the depth of the plow or to wholly remove the plow from the ground.

16. In an apparatus of the class described, the combination of a main section, traction wheels carried by the forward portion thereof, an auxiliary section connected to and supporting the rear end of the main section and embodying pivotally connected frames, ground-engaging supporting means carried by one of said frames, an agricultural implement also carried by one of said frames, motor-driven propelling mechanism and means operative by said propelling mechanism for varying the angular relation between said frames to adjust the operative position of said implement.

17. In an apparatus of the class described, the combination of a main section carrying traction wheels at its forward end and also carrying motor-driven propelling means therefor, an auxiliary section supporting one end of the main section comprising a pair of frames pivotally connected to permit relative angular adjustment in a vertical direction, the forward portion of one of said frames being connected to the main section, ground wheels carried by and supporting the rear portion of the other frame, an agricultural implement carried by the auxiliary section at a point between its connection to the main section and said supporting means, and means operative by said motor-driven propelling mechanism for varying the angular relation between said frames to adjust the operative position of said implement.

18. In an apparatus of the class described, the combination of a main section provided toward its forward end with traction and steering means, an attachment connected to the rear portion of said section and embodying a frame detachably coupled to said main frame an agricultural implement, an adjustable frame fulcrumed at a point intermediate its length to the frame first mentioned and capable of movement in a vertical plane, ground engaging supporting means carried by the rear end of said adjustable frame, an adjusting shaft, and devices operatively connecting the adjusting shaft to the forward end of said adjustable frame to adjust the same vertically and thereby vary the operative position of said implement.

In testimony whereof I have hereunto set my hand in presence of two subscribing witnesses.

LOUIS T. HAGAN.

Witnesses:
 LEWIS R. HAMSHER,
 CLYDE GAINES.